(12) United States Patent
Geyer et al.

(10) Patent No.: US 12,237,761 B2
(45) Date of Patent: Feb. 25, 2025

(54) OPTIMIZING PULSE PATTERNS WITH BERNOULLI POLYNOMIALS

(71) Applicant: ABB Schweiz AG, Baden (CH)

(72) Inventors: Tobias Geyer, Ennetbaden (CH); Hendrik du Toit Mouton, Stellenbosch (ZA)

(73) Assignee: ABB Schweiz AG, Baden (CH)

( * ) Notice: Subject to any disclaimer, the term of this patent is extended or adjusted under 35 U.S.C. 154(b) by 274 days.

(21) Appl. No.: 17/908,159

(22) PCT Filed: Jan. 28, 2021

(86) PCT No.: PCT/EP2021/052010
§ 371 (c)(1),
(2) Date: Aug. 30, 2022

(87) PCT Pub. No.: WO2021/175518
PCT Pub. Date: Sep. 10, 2021

(65) Prior Publication Data
US 2023/0155481 A1    May 18, 2023

(30) Foreign Application Priority Data
Mar. 3, 2020  (EP) .................... 20160674

(51) Int. Cl.
*H02M 1/12*   (2006.01)
*H02M 7/483*  (2007.01)

(52) U.S. Cl.
CPC ............. *H02M 1/12* (2013.01); *H02M 7/483* (2013.01)

(58) Field of Classification Search
CPC ................... H02M 7/483; H02M 1/12
See application file for complete search history.

(56) References Cited

U.S. PATENT DOCUMENTS

| | | | | |
|---|---|---|---|---|
| 2012/0161685 A1* | 6/2012 | Geyer | ............. | H02M 7/48 318/503 |
| 2015/0229233 A1* | 8/2015 | Quevedo | ............. | H02M 7/487 318/812 |

(Continued)

FOREIGN PATENT DOCUMENTS

| | | | | |
|---|---|---|---|---|
| EP | 4080748 A1 * | 10/2022 | ............ | H02J 3/01 |
| WO | WO-2014046555 A1 * | 3/2014 | ............ | H02M 1/12 |
| WO | WO-2018072837 A1 * | 4/2018 | ............ | H02M 1/12 |

OTHER PUBLICATIONS

Czarkowski et al., "Solving the Optimal PWM Problem for Single-Phase Inverters," IEEE Transactions on Circuits and Systems—I: Fundamental Theory and Applications, vol. 49, No. 4, Apr. 2002.

(Continued)

*Primary Examiner* — Sisay G Tiku
(74) *Attorney, Agent, or Firm* — McCarter & English, LLP (57) ABSTRACT

Described herein is method for controlling an electrical converter, the electrical converter converting an input voltage ($v_{in}$) into a multi-level output voltage ($v_{out}$), the method incudes: determining an optimized pule pattern (u(x)); and determining switching states from the optimized pulse pattern (u(x)) and applying the switching states to semiconductor switches of the electrical converter, such that the multi-level output voltage ($v_{out}$) is generated, where the optimized pulse pattern (u(x)) includes a plurality of switching transitions ($\Delta u$), each switching transition ($\Delta u_i$) encoding a transition between two different levels of the multi-level output voltage ($v_{out}$), at a switching angle ($x_i$), where the optimized pulse pattern (u(x)) is determined by optimizing a cost function, where the cost function $J(x) = \Delta u^T A(x) \Delta u$ is a cost matrix A(x), and where each entry of the cost matrix A(x) depends on polynomials into which the switching angles ($x_i$) are input.

18 Claims, 3 Drawing Sheets

(56) References Cited

U.S. PATENT DOCUMENTS

| | | | | |
|---|---|---|---|---|
| 2018/0131266 | A1* | 5/2018 | Rohr | H02M 1/12 |
| 2018/0145579 | A1 | 5/2018 | Spudic et al. | |
| 2020/0350847 | A1* | 11/2020 | Geyer | H02P 27/12 |
| 2022/0368247 | A1* | 11/2022 | Dorfling | H02M 7/53876 |
| 2023/0052562 | A1* | 2/2023 | Burkart | H02M 1/12 |
| 2024/0097553 | A1* | 3/2024 | Geyer | H02M 7/483 |
| 2024/0204650 | A1* | 6/2024 | Tsoumas | H02J 3/36 |

OTHER PUBLICATIONS

Huang et al., "A Novel Simplex Homotopic Fixed-Point Algorithm for Computation of Optimal PWM Patterns," 35th Annual IEEE Power Electronics Specialists Conference, 2004.

Kujan et al., "Complete Fast Analytical Solution of the Optimal Odd Single-Phase Multilevel Problem," IEEE Transactions on Industrial Electronics, vol. 57, No. 7, Jul. 2010.

Kujan et al., "New Special System of Polynomial Equations for 3-phase Multilevel Voltage Converter Derived from the PWM Problem for 1-Phase Inverters," Proceedings of the European Control Conference 2007, Jul. 2007.

Turnbull, "Selected Harmonic Reduction in Static DC-AC Inverters," IEEE, pp. 374-377, Jul. 1964.

Patel et al. "Generalized Techniques of Harmonic Elimination and Voltage control in Thyristor Inverters: Part I—Harmonic Elimination," IEEE Transactions on Industry Applications, vol. IA-9, No. 3, May/Jun. 1973.

Patel et al. "Generalized Techniques of Harmonic Elimination and Voltage control in Thyristor Inverters: Part II—Voltage Control Techniques," IEEE Transactions on Industry Applications, vol. IA-10, No. 5, Sep./Oct. 1974.

Buja et al. "Optimal Pulsewidth Modulation for Feeding AC Motors," IEEE Transactions on Industry Applications, vol. A-13, No. 1, Jan./Feb. 1977.

Buja et al. "Opimum Output Waveforms in PWM Inverters," IEEE Transactions on Industry Applications, vol. IA-16, No. 6, Nov./Dec. 1980.

Wells et al., "Selective Harmonic Control: A General Problem Formulation and Selected Solutions," IEEE Transactions on Power Electronics, vol. 20, No. 6, Nov. 2005.

Tripathi et al., "High-Performance Off-Line Pulse Width Modulation Without Quarter Wave Symmetry for Voltage Source Inverter," 2014 International Conference on Advances in Electronics, Computers and Communications.

Tripathi et al., "Optimal Pulse Width Modulation of Voltage-Source Inverter Fed Motor Drives with Relaxation of Quarter Wave Symmetry Condition," IEEE Conecct 2014.

Birth et al., "Symmetry Relaxation of Three-Level Optimal Pulse Patterns for Lower Harmonic Distortion," Department of Electrical and Electronic Engineering University of Stellenbosch.

Birth et al., "Generalized Three-Level Optimal Pulse Patterns With Lower Harmonic Distortion," IEEE Transactions on Power Electronics, vol. 35, No. 6, Jun. 2020.

Edpuganti et al., "A Survey of Low Switching Frequency Modulation Techniques for Medium-Voltage Multilevel Converters," IEEE Transactions on Industry Applications, vol. 51, No. 5, Sep./Oct. 2015.

Nocedal et al., "Numerical Optimization," 2006, ISBN-10: 0-387-30303-0.

Currie et al. "Opti: Lowering the Barrier Between Open Source Optimizers and the Industrial MATLAB User", Conference: Foundations of Computer-Aided Process Operations, FOCAPO/CPC 2012, Savannah, Georgia, Jan. 2012.

Wächter et al., "On the Implementation of a Primal-Dual Interior Point Filter Line Search Algorithm for Large-Scale Nonlinear Programming," Math. Program., Ser. A 106, 25-57, Apr. 28, 2005.

"Bernoulli Polynomials," XP055722289, pp. 29-39, retrieved from URL:http://www.nhn.ou.edu/milton/p5013/chap4.pdf.

International Search Report and Written Opinion for International Application No. PCT/EP2021/052010, dated Apr. 6, 2021, 15 pages.

* cited by examiner

OPTIMIZING PULSE PATTERNS WITH BERNOULLI POLYNOMIALS

CROSS-REFERENCE TO RELATED APPLICATIONS

This application is a National Stage Entry of International Patent Application No. PCT/EP2021/052010, filed Jan. 28, 2021, and titled "OPTIMIZING PULSE PATTERNS WITH BERNOULLI POLYNOMIALS", which claims the benefit of priority to European Patent Application No. 20160674.6, and titled "OPTIMIZING PULSE PATTERNS WITH BERNOULLI POLYNOMIALS", the entire contents of which are hereby incorporated by reference in their entirety.

BACKGROUND

The present disclosure relates to the field of control of electrical converters. In particular, the present disclosure relates to a method, a computer program, a computer-readable medium and a controller for controlling an electrical converter. Additionally, the present disclosure relates to the electrical converter.

Optimized pulse patterns (OPPs) minimize harmonic distortions in power electronic systems, such as the total demand distortion (TDD) of the load current. For an electrical converter with an inductive load, a cost function may be formulated with the squared amplitudes of the switching function harmonics divided by their harmonic order. By minimizing this cost function, the optimal switching angles can be computed that minimize the current TDD while providing the desired amplitude and phase of the fundamental voltage component. Traditionally, to make the optimization problem computationally tractable, a finite number of harmonic orders has been considered in the optimization problem, resulting in a finite-sum cost function.

US 2018/145579 A1 describes a method for controlling a three-phase electrical converter, wherein a three-phase optimized pulse pattern is selected from a table of pre-computed optimized pulse patterns based. The optimized pulse pattern is optimized by time-shifting switching instants of the optimized pulse pattern such that a cost function being quadratic in the time shifts is minimized.

"Bernoulli Polynomials", pages 29-39, http://www.nhn.ou.edu/'milton/p5013/chap4.pdf inter alia explicitly describes the fourth order Bernoulli polynomial.

BRIEF DESCRIPTION

Embodiments of the present disclosure reduce the total demand distortion of an electrical converter. Embodiments of the present disclosure also reduce the computational effort for determining optimized pulse patterns and/or increase the accuracy for determining switching angles of optimized pulse patterns.

An aspect of the present disclosure relates to a method for controlling an electrical converter. The method may be automatically performed by a controller of the electrical converter. The method may be performed online, i.e. during the operation of the electrical converter.

The electrical converter may include a plurality of semiconductor switches, which may be controlled, such that the electrical converter converts an input voltage into a multi-level output voltage. In general, the output voltage may be a two-level voltage, a three-level voltage or may have a higher number of levels.

The electrical converter may be a medium-voltage converter and/or may operate at switching frequencies of a few hundred Hz, such as 100 Hz to 500 Hz. The electrical converter may be a high-power converter, in particular a high-power low-voltage converter, and/or may operate at a few kHz, such as 1 kHz to 5 kHz.

According to an embodiment of the present disclosure, the method includes: determining a modulation index for the output voltage from a reference voltage, a flux and/or a current reference. The modulation index may be the ratio between the amplitude of the fundamental component of the output voltage to be generated and a possible maximal amplitude. The modulation index may be determined from another reference quantity, such as a reference voltage, a flux and/or a current reference, which may be provided by a superordinated controller, for example, a current controller. The reference voltage may be provided by its amplitude, its frequency and/or its phase.

According to an embodiment of the present disclosure, the method includes: determining an optimized pulse pattern, for example based on the modulation index; and determining switching states from the optimized pulse pattern and applying the switching states to semiconductor switches of the electrical converter, such that the multi-level output voltage is generated. The optimized pulse pattern may be determined from the modulation index. For determining the optimized pattern, the frequency and/or the phase of a reference voltage and/or another reference quantity need not be used, since the optimized pulse pattern may be determined for a $2\pi$ period and the time instants of the switching states then later may be determined dependent on the frequency and/or the phase of the reference voltage. However, it may be possible that the number of switching transitions of the optimized pulse pattern is set dependent on the frequency. The lower the frequency, the more switching transitions for the optimized pulse pattern may be used.

Switching states of the semiconductor switches of the electrical converter are obtained from the optimized pulse pattern. A switching state defines, when (i.e. at which switching instant) a semiconductor switch of the electrical converter is switched into another state (such as conducting and blocking). For this mapping, the frequency and/or the phase of the reference voltage may be used. The electrical converter then generates an output voltage, which follows the reference voltage.

In the optimal case, the output voltage is equal to the reference voltage; because of the discrete nature of the multi-level output voltage, this is, however, not possible. Higher order harmonics are produced. The aim of the optimization procedure of the optimized pulse pattern is to optimize the higher order harmonics with respect to specific goals. Here, the goal may be to reduce the total demand distortion as much as possible.

An optimized pulse pattern includes a plurality of switching transitions, each switching transition encoding a transition between two different levels of the multi-level output voltage at a switching angle.

A switching transition may be encoded with a natural number, for example, +2 for a transition from the level −1 to 1 and −2 for a transition from the level 1 to 1. For electrical converters with more than two output levels, a switching transition may be encoded by +1 and −1, but there may be more than two types of switching transitions.

A switching angle may be a real number encoding an angle between 0 and $2\pi$. For example, the switching angle may be normalized that a value of 1 corresponds to an angle of $2\pi$. Each switching transition may be associated with a switching angle. In the optimization problem, the switching transitions are fixed and the switching angles are varied.

The optimized pulse pattern is determined by optimizing a cost function. The switching angles may be varied, such that for the provided switching transitions, the cost function becomes optimal, such as minimal or maximal. As initial input, an optimized pulse pattern, which may have been optimized with respect to another optimization goal, may be selected. Such an initial value optimized pulse pattern may be stored in the controller. The number of switching transitions may be fixed or may be selected with respect to the frequency of the reference voltage.

In particular, the cost function $J(x)=\Delta u^T A(x)\Delta u$, with the vector x composed of the plurality of switching angles, is a cost matrix $A(x)$, which is multiplied from both sides with a vector $\Delta u$ composed of the plurality of switching transitions, wherein each entry of the cost matrix $A(x)$ depends on polynomials, in particular on fourth order Bernoulli polynomials and/or linear combinations of fourth order Bernoulli polynomials, into which the switching angles are input.

The switching transition vector $\Delta u$ may have a length N of the number of switching transitions. The switching transitions may alternate with increasing switching angle and/or may be provided with a specific pattern. As input to the optimization problem, the switching transition vector $\Delta u$ is fixed.

The cost matrix $A(x)$ is an N×N-matrix and/or may be symmetric. Each entry $A_{ij}(x)$ of the cost matrix may be a linear combination of shifted fourth order Bernoulli polynomials. These linear combinations may be further simplified for determining the polynomial form of the entries $A_{ij}(x)$ of the cost matrix. The input values to these polynomials may be sums and/or differences of the switching angles.

It will be shown below that such type of cost functions provide an exact solution of the optimization problem to minimize the total demand distortion of the optimized pulse pattern. Due to the polynomial nature of the entries of the cost matrix, the optimization problem is much less computationally demanding than other optimization schemes, which may need trigonometric functions and which only approximate the optimization problem.

As will be shown below, an infinite-sum cost function arises in the optimization problem, which however, due to some mathematical tricks can be recasts into polynomial functions in the switching angles. Starting with complex Fourier coefficients and full-wave symmetric single-phase optimized pulse patterns, the cost function may be written in a quadratic form in terms of switching transitions. The coefficients are infinite sums of exponential functions involving pairs of switching angles. It is shown that these infinite sums are fourth-order Bernoulli polynomials.

Note that the fourth-order Bernoulli polynomial is $$B_4(y) = y^4 - 2y^3 + y^2 - \frac{1}{30}.$$

In the cost function and in particular in the cost matrix, shifted Bernoulli polynomials $\tilde{B}_4(y)=B_4(y+s)$, where s is a constant offset, may be used.

The optimization problem may be solved subject to one or more constraints, in particular the ones described below. In general, well known methods are available to solve such a constrained optimization problem, such as gradient-based optimization methods or Newton's method, for which also reliable implementations in software exists.

According to an embodiment of the present disclosure, the cost function is optimized subject to a modulation index constraint, which ensures that the optimized pulse pattern results in the desired modulation index. To this end, the desired modulation index may be added to the optimization problem in the form of a constraint.

The modulation index constraint may be $$\frac{1}{2\pi}\sum_{i=1}^{g}\Delta u_i e^{-j2\pi x_i} = \frac{m}{2}$$

where g denotes the number of switching angles and switching transitions, $\Delta u_i$ are the switching transitions, $x_i$ are the switching angles and m is the modulation index. Here and in the following, $j=\sqrt{-1}$ is the imaginary unit for complex numbers.

According to an embodiment of the present disclosure, the cost function is optimized subject to a DC component constraint, which ensures that a DC component generated by the optimized pulse pattern is 0. However, it also may be possible that a desired DC component is generated.

The DC component constraint may be $$\sum_{i=1}^{g}x_i\Delta u_i = u_0$$

where $\Delta u_i$ are the switching transitions, $x_i$ are the switching angles and $u_0$ is the first level of the output voltage.

According to an embodiment of the present disclosure, the cost function is optimized subject to a transition order constraint, which ensures that an order of the switching transitions is maintained. The transition order constraint may be $$0 \leq x_1 \leq x_2 \ldots \leq x_g \leq 1$$

where $x_i$ are the (normalized) switching angles. It may be that the upper bound is further limited to ½ for a half-wave symmetric optimized pulse pattern or to ¼ for a quarter-wave symmetric optimized pulse pattern.

According to an embodiment of the present disclosure, the entries $A_{ij}(x)$ of the cost matrix depend on a difference $x_i-x_j$ and/or a sum $x_i+x_j$ of the switching angles $x_i$. Specifically, $x_i$ and $x_j$ may be the ith and jth component of the vector of switching angles x.

According to an embodiment of the present disclosure, the entries $A_{ij}(x)$ of the cost matrix are sums of shifted fourth order Bernoulli polynomials $B_4$, i.e.

$$A_{ij}(x) = c\sum_{k}B_4(y_k(x) + s_k)$$

where c is a constant, $y_k(x)$ is either a difference $x_i-x_j$ or a sum $x_i+x_j$ of the switching angles $x_i$, and where the $s_k$ are shifting constant. The operator "~" in the claims has to interpreted as "proportional", i.e. that the left-hand side is equal to the right-hand side multiplied with a constant (here c).

According to an embodiment of the present disclosure, the entries $A_{ij}(x)$ of the cost matrix are $$A_{ij}(x)=cB_4(x_i-x_j)$$

where c is a constant, $B_4$ is the fourth order Bernoulli polynomial and $x_i$ and $x_j$ are the switching angles. When no further symmetry is imposed on the form of the optimized pulse pattern, the cost matrix may have such a form. This is derived in detail below.

To simplify the problem, it is possible to impose a quarter- and/or half-wave symmetry on the optimized pulse pattern. In particular, the number of switching angles, which have to be determined, may then be reduced by the factor of 2 or 4. This may reduce the computational effort significantly. However, these simplifications restrict the solution space and, in general, may lead to suboptimal solutions. In the present approach, using selector variables, the cost functions for half-wave symmetric as well as quarter- and half-symmetric optimized pulse patterns are derived.

According to an embodiment of the present disclosure, half-wave symmetry is imposed on the optimized pulse pattern. Half-wave symmetry may mean that the optimized pulse pattern between the switching angles 0 and $\pi$ is equal to the negated switching pattern between $\pi$ and $2\pi$.

In this case, it can be shown and will be shown below that the entries $A_{ij}(x)$ of the cost matrix are $$A_{ij}(x) = c P_3(x_i - x_j), \text{ where } P_3(y) = B_4(y) - B_4\left(y + \frac{1}{2}\right)$$

where c is a constant, $B_4$ is the fourth order Bernoulli polynomial, and $x_i$ and $x_j$ are the switching angles. The polynomial $P_3(y)$ may be further simplified to a third order polynomial.

According to an embodiment of the present disclosure, quarter-wave and half-wave symmetry is imposed on the optimized pulse pattern. Quarter-wave symmetry may mean that the optimized pulse pattern between the switching angles 0 and $\pi/2$ is equal to the mirrored switching pattern between $\pi/2$ and $\pi$.

In this case, it can be shown and will be shown below that the entries $A_{ij}(x)$ of the cost matrix are $$A_{ij}(x) = c P_3(x_i + x_j) + c P_3(x_i - x_j), \text{ where } P_3(y) = B_4(y) - B_4\left(y + \frac{1}{2}\right)$$

where c is a constant, $B_4$ is the fourth order Bernoulli polynomial, and $x_i$ and $x_j$ are the switching angles. It has to be noted that when the resulting polynomial $P_3(y)$ of shifted Bernoulli polynomials for quarter- and half-wave symmetry is further simplified, the fourth order terms cancel. $P_3(y)$ may be a third-order polynomial function.

The above cost functions all may be applied to single-phase optimized pulse patterns. These pulse patterns also may be part of a multi-phase optimized pulse pattern. The phases may be optimized independently from each other.

For three-phase optimized pulse patterns, further symmetry assumptions may be imposed, which may further simplify the optimization problem. In his case, possible cost functions are again polynomial functions.

According to an embodiment of the present disclosure, the multi-level output voltage is a three-phase voltage, and 120° symmetry is imposed between the three phases. The 120° symmetry may mean that triplen-order harmonics of the harmonic order 3, 6, 9, etc can be ignored in the optimization problem. These triplen-order voltage harmonics may incur no current harmonics in a three-phase system with a floating star point.

In this case, it can be shown and will be shown below that the entries $A_{ij}(x)$ of the cost matrix are $$A_{ij}(x) = c S_{3f}(x_i - x_j), \text{ where } S_{3f}(y) = 2B_4(y) - B_4\left(y + \frac{1}{3}\right) - B_4\left(y - \frac{1}{3}\right)$$

where c is a constant, $B_4$ is the fourth order Bernoulli polynomial, and $x_i$ and $x_j$ are the switching angles.

According to an embodiment of the present disclosure, the multi-level output voltage is a three-phase voltage, and a 120° symmetry is imposed between the three phases and half-wave symmetry is imposed on the optimized pulse pattern.

In this case, it can be shown and will be shown below that the entries $A_{ij}(x)$ of the cost matrix are $$A_{ij}(x) = c S_{3h}(x_i - x_j), \text{ where } S_{3h}(y) =$$
$$2B_4(y) - B_4\left(y + \frac{1}{3}\right) - B_4\left(y - \frac{1}{3}\right) - 2B_4\left(y + \frac{1}{2}\right) + B_4\left(y + \frac{1}{6}\right) + B_4\left(y - \frac{1}{6}\right)$$

where c is a constant, $B_4$ is the fourth order Bernoulli polynomial, and $x_i$ and $x_j$ are the switching angles.

According to an embodiment of the present disclosure, the multi-level output voltage is a three-phase voltage, and a 120° symmetry is imposed between the three phases and half-wave and quarter-wave symmetry is imposed on the optimized pulse pattern.

In this case, it can be shown and will be shown below that the entries $A_{ij}(x)$ of the cost matrix are $$A_{ij}(x) = c\, S_{3h}(x_i + x_j) + c\, S_{3h}(x_i - x_j), \text{ where } S_{3h}(y) =$$
$$2B_4(y) - B_4\left(y + \frac{1}{3}\right) - B_4\left(y - \frac{1}{3}\right) - 2B_4\left(y + \frac{1}{2}\right) + B_4\left(y + \frac{1}{6}\right) + B_4\left(y - \frac{1}{6}\right)$$

as defined above, where c is a constant, $B_4$ is the fourth order Bernoulli polynomial, and $x_i$ and $x_j$ are the switching angles.

Further aspects of the present disclosure relate to a computer program, which when executed by a processor is adapted for performing the method as described above and below and to a computer-readable medium, in which such a computer program is stored. The method may be implemented in software and may be run on a controller having a processor and a memory in which the computer program is stored.

A computer-readable medium may be a floppy disk, a hard disk, an USB (Universal Serial Bus) storage device, a RAM (Random Access Memory), a ROM (Read Only Memory), an EPROM (Erasable Programmable Read Only Memory) or a FLASH memory. A computer readable medium may also be a data communication network, e.g. the Internet, which allows downloading a program code. In general, the computer-readable medium may be a non-transitory or transitory medium.

A further aspect of the present disclosure relates to a controller for an electrical converter adapted for performing the method as described above and below. It has to be noted that the method also may be at least partially implemented in hardware, for example in a DSP or FPGA.

A further aspect of the present disclosure relates to an electrical converter, which includes a plurality of semiconductor switches for converting an input voltage into an output voltage and which includes a controller as described above and below.

It has to be understood that features of the method as described in the above and in the following may be features of the electrical converter, the computer program, the computer readable medium and the controller, as described in the above and in the following, and vice versa.

These and other aspects of the present disclosure will be apparent from and elucidated with reference to the embodiments described hereinafter.

BRIEF DESCRIPTION OF THE DRAWINGS

The subject matter of the present disclosure will be explained in more detail in the following text with reference to exemplary embodiments which are illustrated in the attached drawings.

In principle, identical parts are provided with the same reference symbols in the figures.

DETAILED DESCRIPTION

Figure 1:
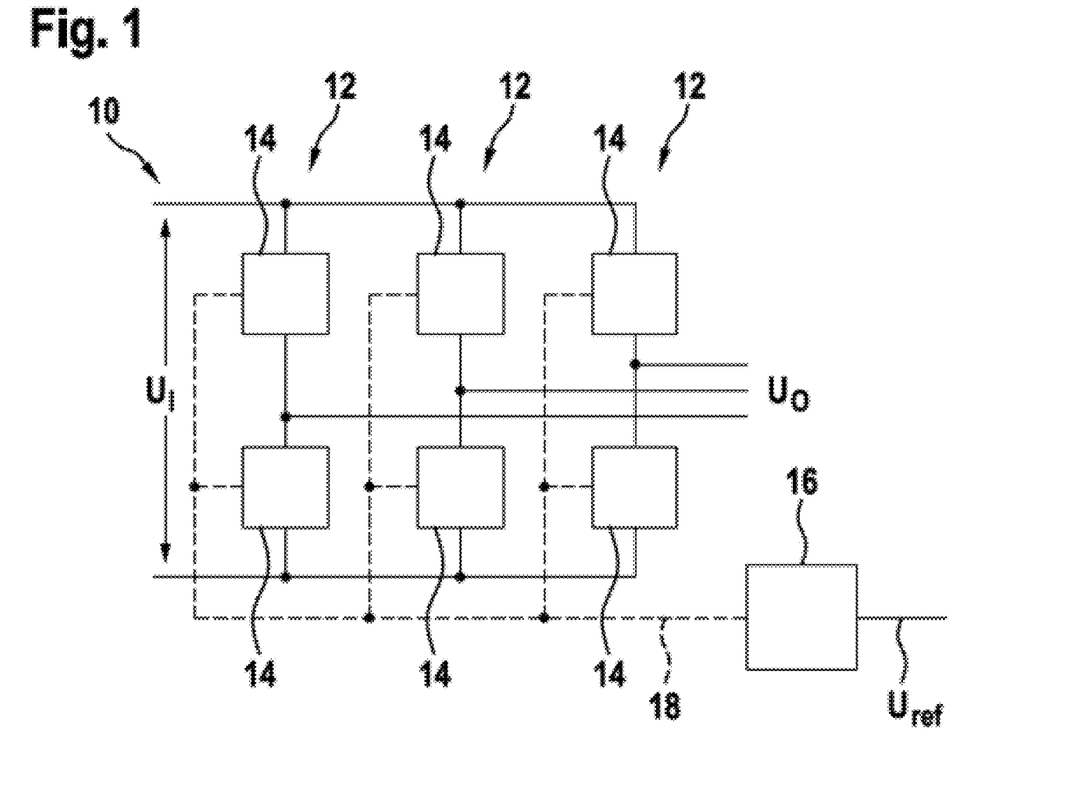
FIG. 1 schematically shows an electrical converter according to an embodiment of the present disclosure.

1 The Electrical Converter and the Optimization Problem
1.1 The Converter FIG. 1 shows an electrical converter 10, which includes three phase legs 12, each of which is composed of two semiconductor switches 14. A controller 16 of the electrical converter 10 receives a reference voltage $v_{ref}$ and based on this reference voltage $v_{ref}$ produces switching states 18, which are applied to the semiconductor switches 14.

Subject to the control of the controller 16, the electrical converter 10 converts an it voltage $v_{in}$, which may be provided by a DC link, to a multi-level output voltage $v_{out}$. In the shown case, the output voltage $v_{out}$ has two levels, however, in general, the output voltage $v_{out}$ may have three, four, five, etc. levels. For example, other types of phase legs 12 may be used, such as neutral point clamped phase legs, which may produce a three-level output voltage $v_{out}$.

As shown, the output voltage $v_{out}$ may be a three-phase voltage. However, it also is possible that the output voltage $v_{out}$ is a single-phase output voltage $v_{out}$, for example such as the one provided by one of the phase legs 12.

Figure 2:
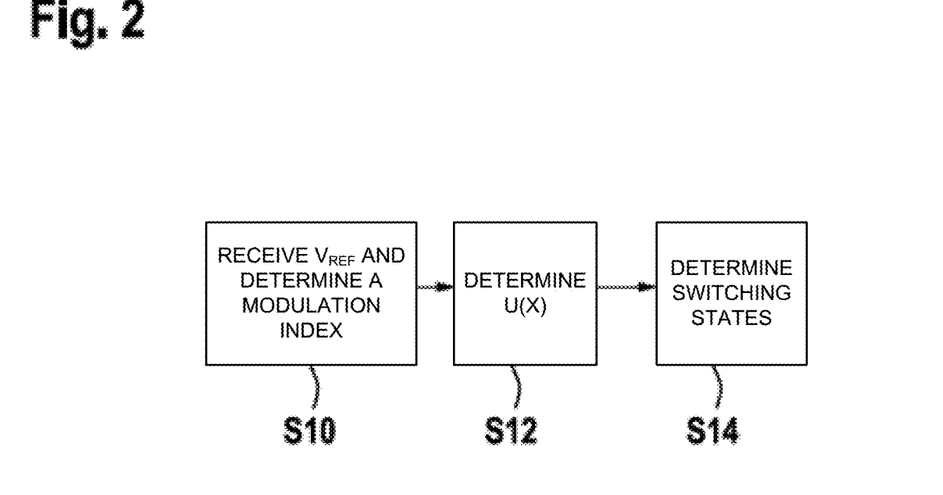
FIG. 2 shows a flow diagram for a method for controlling an electrical converter according to an embodiment of the present disclosure.
Figure 3:
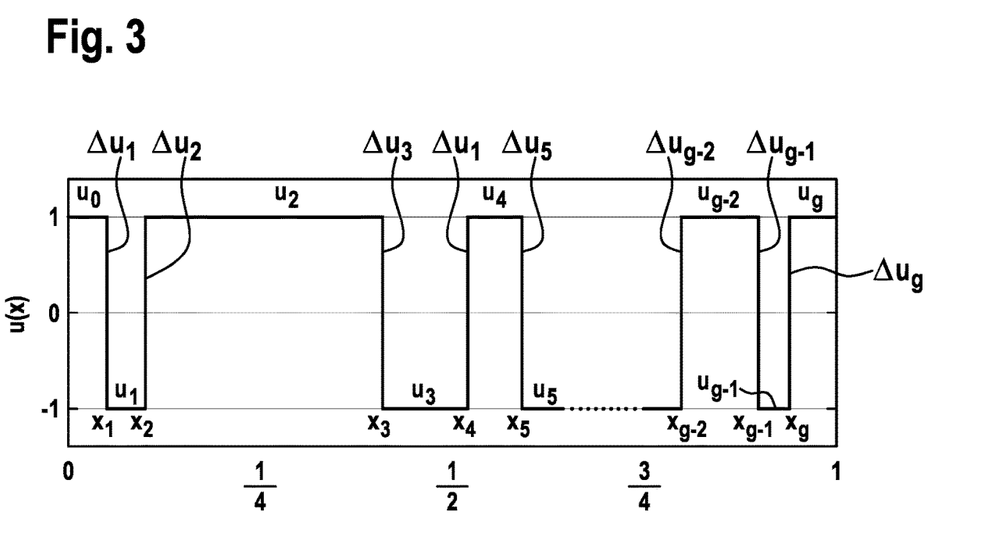
FIG. 3 shows a diagram with an optimized pulse pattern used in a method for controlling an electrical converter according to an embodiment of the present disclosure.

FIG. 2 shows a flow diagram illustrating a method that may be performed by the controller 16 for controlling the electrical converter 10. The controller 16 may include a memory and a processor and the method may be implemented as a computer program in the controller 16.

In step S10, the controller 16 receives the reference voltage $v_{ref}$ and determines a modulation index for the output voltage $v_{out}$ from the reference voltage $V_{ref}$. The reference voltage $v_{ref}$ may be provided by a superordinated controller, which for example is a torque controller for an electrical machine supplied by the electrical converter 10.

In step S12, the controller 16 determines an optimized pule pattern u(x) based on the modulation index. One phase of such a pulse pattern u(x) is shown in FIG. 2. In general, an initial pulse pattern may be selected, for example dependent on the frequency and/or modulation index of the reference voltage $v_{ref}$. The initial pulse pattern is then optimized as described above and below.

In step S14, the controller 16 determines switching states 18 from the optimized pulse pattern u(x) and applies the switching states 18 to the semiconductor switches 14 of the electrical converter 10, such that the multi-level output voltage $v_{out}$ is generated.

1.2 Pulse Patterns

FIG. 2 shows a single-phase two-level pulse pattern u(x) with g+1 switch positions $u_i$, $i \in \{0, 1, 2, \ldots, g\}$. The switch positions, which encode the voltage levels of the (single-phase) output voltage $v_{out}$, are restricted to the integer set $u_i \in \{-1, 1\}$. They switching angles $x_i$, with $i \in \{1, 2, \ldots, g\}$, are normalized to the interval $0 \leq x_i \leq 1$. The g switching transitions $\Delta x_i$ with $i \in \{1, 2, \ldots, g\}$ are the differences between two consecutive switch positions $u_i$.

The pulse pattern u(x) is a sequence of switch positions; therefore, it may be seen as a piecewise constant signal. In the interval $0 \leq x \leq 1$, it can be described by $$u(x) = \begin{cases} u_0, & \text{if } 0 \leq x < x_1 \\ u_1, & \text{if } x_1 \leq x < x_2 \\ \vdots & \vdots \\ u_{g-1}, & \text{if } x_{g-1} \leq x < x_g \\ u_g, & \text{if } x_g \leq x \leq 1 \end{cases} \quad (1)$$

The pulse pattern defined in Eq. (1) has the initial switch position $u_0$ and the period 1. Alternatively, the pulse pattern may be defined over the interval $[0, 2\pi]$ with the switching angles $2\pi x_i$. Later, when rewriting the optimization problem below in terms of polynomials, the use of normalized switching angles will lead to a more compact mathematical representation.

In this section, no symmetry, other than the fact that the waveform must be periodic with period 1, is imposed on u(x). In order to ensure periodicity, the last switch position is equal to the first one, i.e., $u_g = u_0$.

Given the sequence of switch positions $u_i$, $i \in \{1, 2, \ldots, g\}$, the aim is to find the optimal switching angles $x_i$ that minimize the weighted voltage distortion.

1.3 Fourier Coefficients

Since the pulse pattern u(x) is periodic, it can be expressed as the exponential Fourier series $$u(x) = \sum_{n=-\infty}^{\infty} c_n e^{j2\pi n x}, \quad (2)$$

with the complex Fourier coefficients $$c_n = \int_0^1 u(x) e^{-j2\pi n x} dx \quad (3)$$

where $n \in \{0, +1, \pm 2, \ldots, \pm\infty\}$. Note that j denotes the imaginary unit. Inserting Eq. (1) into the Fourier coefficient in Eq. (3) leads to $$c_n = \int_0^{x_1} u_0 e^{-j2\pi n x} dx + \int_{x_1}^{x_2} u_1 e^{-j2\pi n x} dx + \ldots + \int_{x_y}^{1} u_g e^{-j2\pi n x} dx \quad (4)$$

and $$c_n = j\frac{1}{2\pi n}\sum_{i=1}^{g}(u_{i-1} - u_i)e^{-j2\pi n x_i} \quad (5)$$

where it has been used that $u_g = u_0$. Defining the ith switching transition $\Delta u_i$, for $i \in \{1, 2, \ldots, g\}$, as $$\Delta u_i = u_i - u_{i-1} \quad (6)$$

allows us to write the Fourier coefficient in Eq. (3) in the compact form $$c_n = -j\frac{1}{2\pi n}\sum_{i=1}^{g}\Delta u_i e^{-j2\pi n x_i} \quad (7)$$

for $n \in \{\pm 1, \pm 2, \ldots, \pm \infty\}$. The DC component of the switching function $u(x)$ is given by $$c_0 = \int_0^1 u(x)dx = u_0 - \sum_{i=1}^{g}\Delta u_i x_i. \quad (8)$$

1.4 Total Demand Distortion of the Current

The two-level converter 10 with an inductive load is considered. To simplify the analysis, a per unit system is introduced and normalized quantities are adopted. The base quantities are the peak value of the load's rated phase voltage, the peak value of the rated load current, and the rated fundamental frequency. Unless otherwise stated, all quantities are given in this per unit system.

Let $V_{dc}$ denote the total dc-link voltage, and $f_1$ is the fundamental frequency. The complex voltage harmonic at the frequency $nf_1$ is given by $$v_n = \frac{1}{2}V_{dc}c_n. \quad (9)$$

n is referred to as the order of the harmonic component. Note that $n \in \mathbb{Z}$.

It is assumed that the converter 10 supplies a purely inductive load with the load reactance $X_l$. The nth complex current harmonic, with $n \neq 0$, follows to $$i_n = \frac{v_n}{jn\omega_1 X_l} = \frac{V_{dc}}{2j\omega_1 X_l}\frac{c_n}{n}, \quad (10)$$

where the angular fundamental frequency $w_1 = 2\pi f_1$ has been introduced and Eq. (9) has been used. Thus, the amplitude of the nth current harmonic is the absolute value $$|i_n| = \frac{V_{dc}}{2\omega_1 X_l}\frac{|c_n|}{|n|}. \quad (11)$$

The total demand distortion (TDD) of the current in one phase is commonly defined as $$I_{TDD} = \frac{1}{\sqrt{2}I_{nom}}\sqrt{\sum_{n\neq\pm 1}|i_n|^2} = \frac{1}{\sqrt{2}I_{nom}}\frac{V_{dc}}{2\omega_1 X_l}\sqrt{\sum_{n\neq\pm 1}\left(\frac{c_n}{n}\right)^2}, \quad (12)$$

where $I_{nom}$ refers to the nominal rms stator current. Since the per unit system is based on the peak load current, the nominal peak current is one, i.e. $\sqrt{2}I_{nom} = 1$ pu. Because the Fourier coefficients $c_n$ are defined at $n \in \mathbb{Z}$, the sum in Eq. (12) is also defined over $n \in \mathbb{Z}$. The positive and negative-sequence fundamental components (with the harmonic order $n = \pm 1$) are excluded from the sum.

1.5 Optimization Problem

As a cost function, it is convenient to choose the infinite sum $$J'_{1f}(x) = \sum_{n=\pm 2}^{\pm\infty}\left(\frac{|c_n|}{n}\right)^2, \quad (13)$$

which is proportional to the squared current MD in inductive loads, see Eq. (12). The indices 1 and f relate to the single-phase case and full-wave symmetry, respectively. The vector of normalized switching angles is defined as $x := [x_1 \ x_2 \ \ldots \ x_g]^T$. Note that the fundamental component (with the harmonic order $n = \pm 1$) and the DC component are excluded from the sum.

Three constraints may be imposed when formulating the optimization problem.

The first constraint may be that the amplitude and phase of the fundamental component of $u(x)$ must be equal to the desired values. For a sine wave, the fundamental component must have an amplitude equal to the modulation index m and a phase of $$-\frac{\pi}{2}$$

rad, i.e., the Fourier coefficient $c_1$ from Eq. (7) must be equal $$-j\frac{m}{2}.$$

According to Eq. (7) this implies that $$\frac{1}{2\pi}\sum_{i=1}^{g}\Delta u_i e^{-j2\pi x_i} = \frac{m}{2}. \quad (14)$$

The second constraint may result from the fact that the DC component of $u(x)$ usually has to be equal to zero, i.e., $$\sum_{i=1}^{g}x_i\Delta u_i = u_0 \quad (15)$$

according to Eq. (8).

The third constraint may ensure that the normalized switching angles are in ascending order and may be restricted to the interval [0, 1], i.e., $$0 \leq x_1 \leq x_2 \leq \ldots \leq x_g \leq 1. \quad (16)$$

The optimization problem may thus be formulated as $$x_{opt} = \arg \min_{x} J'_{1f}(x) \qquad (17)$$

subject to (14), (15) and (16).

2 Single-Phase Formulation

As shown in this section, the infinite-sum cost function may be written as a finite sum of quartic polynomials in two variables. The proposed formulation is exact and does not make any approximations.

2.1 Full-Wave Symmetry

Single-phase optimized pulse patterns are considered. The optimization problem in Eq. (17) is based on the infinite-sum cost function in Eq. (13).

2.1.1 Reformulated Cost Function

In order to simplify the notation, the slightly modified cost function $$J_{1f}(x) = \sum_{n=\pm 1}^{\pm\infty} \left(\frac{|c_n|}{n}\right)^2 \qquad (18)$$

is introduced. Unlike the original cost function $J'_{1f}(x)$ of Eq. (13), $J_{1f}(x)$ includes the fundamental component with harmonic order $n=\pm 1$. However, constraint (14) ensures that the amplitude of the fundamental component is equal to the modulation index m. Since the average power in the fundamental component is equal to $$\frac{m^2}{2},$$

this leads to the following simple relation between the two cost functions:

$$J'_{1f}(x) = J_{1f}(x) - \frac{m^2}{2}. \qquad (19)$$

Let $\Delta u$ denote the vector of switching transitions $$\Delta u := [\Delta u_1 \Delta u_2 \ldots \Delta u_g]^T. \qquad (20)$$

For every integer $k \geq 2$, let $c_k$ denote the k-dimensional vector of weighted complex Fourier coefficients:

$$c_k := \left[\frac{c_{-k}}{-k} \ldots \frac{c_{-2}}{-2} \frac{c_{-1}}{-1} \frac{c_1}{1} \frac{c_2}{2} \ldots \frac{c_k}{k}\right]^T. \qquad (21)$$

Also the binary selector variables $\delta_n$, with $n \in \{\pm 1, \pm 2, \ldots, \pm\infty\}$ are introduced, which assume the values 0 or 1. It is assumed that $\delta_n = \delta_{-n}$ for $n \in \{\pm 1, \pm 2, \ldots, \pm\infty\}$. These variables will later allow one to remove specific harmonics from the cost function. Multiplying the selector variables with the components of the vector of weighted Fourier coefficients $c_k$ leads to $$\left[\frac{c_{-k}}{-k}\delta_{-k} \ldots \frac{c_{-2}}{-2}\delta_{-2} \frac{c_{-1}}{-1}\delta_{-1} \frac{c_1}{1}\delta_1 \frac{c_2}{2}\delta_2 \ldots \frac{c_k}{k}\delta_k\right]^T = D_k c_k \qquad (22)$$

with the diagonal matrix $$D_k := \text{diag}(\delta_{-k}, \ldots, \delta_{-2}, \delta_{-1}, \delta_1, \delta_2, \ldots, \delta_k). \qquad (23)$$

By making use of Eq. (7), vector $c_k$ can be factored as:

$$c_k = -\frac{j}{2\pi} E_k \Delta u, \qquad (24)$$

where $E_k$ is the matrix of exponential terms:

$$E_k := \begin{bmatrix} \frac{e^{j2\pi kx_1}}{k^2} & \frac{e^{j2\pi kx_2}}{k^2} & \cdots & \frac{e^{j2\pi kx_g}}{k^2} \\ \vdots & \vdots & \vdots & \vdots \\ \frac{e^{j4\pi x_1}}{2^2} & \frac{e^{j4\pi x_2}}{2^2} & \cdots & \frac{e^{j4\pi x_g}}{2^2} \\ \frac{e^{j2\pi x_1}}{1^2} & \frac{e^{j2\pi x_2}}{1^2} & \cdots & \frac{e^{j2\pi x_g}}{1^2} \\ \frac{e^{-j2\pi x_1}}{1^2} & \frac{e^{-j2\pi x_2}}{1^2} & \cdots & \frac{e^{-j2\pi x_g}}{1^2} \\ \frac{e^{-j4\pi x_1}}{2^2} & \frac{e^{-j4\pi x_2}}{2^2} & \cdots & \frac{e^{-j4\pi x_g}}{2^2} \\ \vdots & \vdots & \vdots & \vdots \\ \frac{e^{-j2\pi kx_1}}{k^2} & \frac{e^{-j2\pi kx_2}}{k^2} & \cdots & \frac{e^{-j2\pi kx_g}}{k^2} \end{bmatrix}. \qquad (25)$$

The expression $$J_k(x) := c_k^* D_k^* D_k c_k \qquad (26)$$

is the finite sum of squared harmonics from harmonic order $-k$ to $k$, with $k \in \{2, 3, \ldots\}$, where $*$ denotes the conjugate transpose. Note that, for every fixed value of $x$, Eq. (26) is a sequence of numbers that converges to the (modified) cost function in Eq. (18).

Owing to the fact that $D_k^* D_k = D_k$, Eq. (26) simplifies to $$J_k(x) = c_k^* D_k c_k. \qquad (27)$$

Eq. (27) is rewritten with the help of Eq. (24), as $$J_k(x) = \frac{1}{4\pi^2} \Delta u^T E_k^* D_k E_k \Delta u = \frac{1}{4\pi^2} \Delta u^T A_k \Delta u, \qquad (28)$$

where $$A_k := \qquad (29)$$

$$\begin{bmatrix} \sum_{n=\pm 1}^{\pm k} \delta_n \frac{1}{n^4} & \sum_{n=\pm 1}^{\pm k} \delta_n \frac{e^{j2\pi n(x_2-x_1)}}{n^4} & \cdots & \sum_{n=\pm 1}^{\pm k} \delta_n \frac{e^{j2\pi n(x_g-x_1)}}{n^4} \\ \sum_{n=\pm 1}^{\pm k} \delta_n \frac{e^{j2\pi n(x_1-x_2)}}{n^4} & \sum_{n=\pm 1}^{\pm k} \delta_n \frac{1}{n^4} & \cdots & \sum_{n=\pm 1}^{\pm k} \delta_n \frac{e^{j2\pi n(x_2-x_g)}}{n^4} \\ \vdots & \vdots & \vdots & \vdots \\ \sum_{n=\pm 1}^{\pm k} \delta_n \frac{e^{j2\pi n(x_1-x_g)}}{n^4} & \sum_{n=\pm 1}^{\pm k} \delta_n \frac{e^{j2\pi n(x_2-x_g)}}{n^4} & \cdots & \sum_{n=\pm 1}^{\pm k} \delta_n \frac{1}{n^4} \end{bmatrix}.$$

Each of the sums in Eq. (29) is of the form $$S_{pq} := \sum_{n=\pm 1}^{\pm k} \delta_n \frac{e^{j2\pi n(x_p-x_q)}}{n^4} \qquad (30)$$

These expressions are even functions, i.e., $$S_{pq} := \sum_{n=\pm 1}^{\pm k} \delta_n \frac{e^{j2\pi n(x_p - x_q)}}{n^4} = \sum_{n=\pm 1}^{\pm k} \delta_n \frac{e^{j2\pi n(x_q - x_p)}}{n^4} = S_{qp}, \quad (31)$$

$$p, q \in \{1, 2, \ldots, g\},$$

which implies that $A_k$ is a symmetric matrix.

Now the cost matrix $A$ is defined:

$$A = \lim_{k \to \infty} A_k \quad (32)$$

$$= \begin{bmatrix} \sum_{n=\pm 1}^{\pm\infty} \delta_n \frac{1}{n^4} & \sum_{n=\pm 1}^{\pm\infty} \delta_n \frac{e^{j2\pi n(x_2 - x_1)}}{n^4} & \cdots & \sum_{n=\pm 1}^{\pm\infty} \delta_n \frac{e^{j2\pi n(x_g - x_1)}}{n^4} \\ \sum_{n=\pm 1}^{\pm\infty} \delta_n \frac{e^{j2\pi n(x_2 - x_1)}}{n^4} & \sum_{n=\pm 1}^{\pm\infty} \delta_n \frac{1}{n^4} & \cdots & \sum_{n=\pm 1}^{\pm\infty} \delta_n \frac{e^{j2\pi n(x_g - x_2)}}{n^4} \\ \vdots & \vdots & \vdots & \vdots \\ \sum_{n=\pm 1}^{\pm\infty} \delta_n \frac{e^{j2\pi n(x_g - x_1)}}{n^4} & \sum_{n=\pm 1}^{\pm\infty} \delta_n \frac{e^{j2\pi n(x_g - x_2)}}{n^4} & \cdots & \sum_{n=\pm 1}^{\pm\infty} \delta_n \frac{1}{n^4} \end{bmatrix}. \quad (33)$$

For full-wave symmetry all harmonics except the DC component are penalized. To this end, all binary selector variables are set to one, i.e., $\delta_n = 1$, for all $n \in \{\pm 1, \pm 2, \ldots \pm k;\}$. This implies that $$J_{1f}(x) = \lim_{k \to \infty} J_k(x). \quad (34)$$

With these definitions and according to Eqs. (28) and (34), the cost function in Eq. (18) can be rewritten as $$J_{1f}(x) = \frac{1}{4\pi^2} \Delta u^T A_{1f} \Delta u, \quad (35)$$

with the cost matrix $$A_{1f} = \begin{bmatrix} \sum_{n=+1}^{\pm\infty} \frac{1}{n^4} & \sum_{n=+1}^{\pm\infty} \frac{e^{j2\pi n(x_2 \cdots x_1)}}{n^4} & \cdots & \sum_{n=+1}^{\pm\infty} \frac{e^{j2\pi n(x_g \cdots x_1)}}{n^4} \\ \sum_{n=+1}^{\pm\infty} \frac{e^{j2\pi n(x_2 \cdots x_1)}}{n^4} & \sum_{n=+1}^{\pm\infty} \frac{1}{n^4} & \cdots & \sum_{n=+1}^{\pm\infty} \frac{e^{j2\pi n(x_g \cdots x_2)}}{n^4} \\ \vdots & \vdots & \vdots & \vdots \\ \sum_{n=+1}^{\pm\infty} \frac{e^{j2\pi n(x_2 \cdots x_2)}}{n^4} & \sum_{n=+1}^{\pm\infty} \frac{e^{j2\pi n(x_g \cdots x_2)}}{n^4} & \cdots & \sum_{n=+1}^{\pm\infty} \frac{1}{n^4} \end{bmatrix} \quad (36)$$

Note that $A_{1f}$ is a real symmetric matrix.

2.1.2 Cost Function Based on Bernoulli Polynomials

Recall the constraint (16), which ensures that the normalized switching angles are in ascending order and are bounded by zero and one. This implies that $0 \leq x_p - x_q \leq 1$ holds true for $p \geq q$, with $p, q \in \{1, 2, \ldots, g\}$. We define $y = x_p - x_q$, with $p, q \in \{1, 2, \ldots, g\}$ and $p \geq q$. By definition, $y \in [0,1]$. To simplify the notation we refrain from adding the indices p and q to y here.

Each infinite sum in Eq. (36) is proportional to the Fourier series expansion of a Bernoulli polynomial, i.e., $$\sum_{n=+1}^{\pm\infty} \frac{e^{j2\pi n y}}{n^4} = -\frac{2\pi^4}{3} B_4(y), \quad (37)$$

for $0 \leq y \leq 1$, where $B_4(y)$ is the fourth-order Bernoulli polynomial $$B_4(y) = y^4 - 2y^3 + y^2 - \frac{1}{30}. \quad (38)$$

Eq. (37) is only valid for y in the interval $0 \leq y \leq 1$. The periodic fourth-order polynomial $\mathcal{B}_4(y)$ is introduced as $$\mathcal{B}_4(y) = B_4(y - \lfloor y \rfloor), \quad (39)$$

where $\lfloor y \rfloor = \max\{z \in \mathbb{Z} \mid z \leq y\}$.

Matrix $A_{1f}$, which was defined in Eq. (36), can now be written in terms of fourth-order polynomials, i.e., $$A_{1f} = -\frac{2\pi^4}{3} \begin{bmatrix} B_4(0) & B_4(x_2 - x_1) & \cdots & B_4(x_g - x_1) \\ B_4(x_2 - x_1) & B_4(0) & \cdots & B_4(x_g - x_2) \\ \vdots & \vdots & \vdots & \vdots \\ B_4(x_g - x_1) & B_4(x_g - x_1) & \cdots & B_4(0) \end{bmatrix}, \quad (40)$$

and the cost function in Eq. (35) turns into $$J_{1f} = -\frac{\pi^2}{6} \Delta u^T \begin{bmatrix} B_4(0) & B_4(x_2 - x_1) & \cdots & B_4(x_g - x_1) \\ B_4(x_2 - x_1) & B_4(0) & \cdots & B_4(x_g - x_2) \\ \vdots & \vdots & \vdots & \vdots \\ B_4(x_g - x_1) & B_4(x_g - x_1) & \cdots & B_4(0) \end{bmatrix} \Delta u. \quad (41)$$

2.1.3 Optimization Problem Based on Bernoulli Polynomials

The optimization problem in Eq. (17) of full-wave symmetric single-phase OPPs can now be stated in terms of Bernoulli polynomials:

$$x_{opt} = \arg \underset{x}{\text{minimize}} \; J_{1f}(x) \quad (42)$$

$$\text{subject to } \frac{1}{2\pi} \sum_{i=1}^{g} \Delta u_i e^{-j2\pi x_i} = \frac{m}{2}$$

$$\sum_{i=1}^{g} x_i \Delta u_i = u_0$$

$$0 \leq x_1 \leq x_2 \leq \ldots \leq x_g \leq 1.$$

The infinite-sum cost function $J_{1f}$ is given in Eq. (41); the vector of normalized switching angles was defined as $x := [x_1 \; x_2 \; \ldots \; x_g]^T$.

2.2 Half-Wave Symmetry

Half-wave symmetry implies that the second half of the pulse pattern $u(x)$ is the exact opposite of the first half, i.e., $$u\left(x + \frac{1}{2}\right) = -u(x) \text{ for } 0 \leq x \leq \frac{1}{2}.$$

This condition is only satisfied for a two-level converter if the number of switching transitions h:=g/2 per half cycle is odd. Half-wave symmetry imposes the following two conditions on the normalized switching angles $x_i$ and the switching transitions $\Delta u_i$:

$$x_p = x_{p-h} + \frac{1}{2} \text{ and } \Delta u_p = -\Delta u_{p-h}, \quad (43)$$

for $p \in \{h+1, ..., g\}$.

2.2.1 Fourier Coefficients

The exponential Fourier series expansion of functions with half-wave symmetry contains only odd-order harmonics, i.e., $$c_n = \begin{cases} 2\int_0^{0.5} u(x)e^{-j2\pi nx} dx & \text{for odd } n \\ 0 & \text{for even } n. \end{cases} \quad (44)$$

This also implies that the DC component is always zero.
Similar to the derivation in Sect. 1.3, the Fourier coefficient for odd harmonic orders n follows as $$c_n = 2\left(\int_0^{x_1} u_0 e^{-j2\pi nx} dx + \int_{x_1}^{x_2} u_1 e^{-j2\pi nx} dx + \cdots + \int_{x_h}^{0.5} u_h e^{-j2\pi nx} dx\right) \quad (45)$$

$$= -j\frac{1}{\pi n}\sum_{i=1}^{h} \Delta u_i e^{-j2\pi nx_i} \quad (46)$$

where it has been used that $u_h = -u_0$ holds for two-level converters.

2.2.2 Cost Function

The cost function for half-wave symmetric pulse patterns is defined as $$J_{1h}(x) = \sum_{n=+1,+3,...}^{\pm\infty} \left(\frac{|c_n|}{n}\right)^2, \quad (47)$$

where the vector of normalized switching angles has been redefined as $x:=[x_1 \ x_2 \ \ldots \ x_h]^T$. As in the case of the cost function in Eq. (18) for full-wave symmetry, $J_{1h}$ includes the fundamental component. Even-order harmonics, however, are not penalized.

Following the procedure in Sect. 2.1.1, the cost function can be rewritten in the form $$J_{1h}(x) = \frac{1}{\pi^2}\Delta u^T A_{1h} \Delta u, \quad (48)$$

where the vector of switching transitions has been redefined as $\Delta u:=[\Delta u_1 \ \Delta u_2 \ \ldots \ \Delta u_h]^T$.

The matrix $A_{1h}$ is equal to A in Eq. (33) with the binary selector variables set to $$\delta_n = \frac{1}{2}(1 - e^{-j\pi n}) = \begin{cases} 0 & \text{for even } n \\ 1 & \text{for odd } n. \end{cases} \quad (49)$$

Each of the infinite sums in $A_{1h}$ has the form $$\sum_{n=\pm 1}^{\pm\infty} \delta_n \frac{e^{j2\pi ny}}{n^4} = \frac{1}{2}\left[\sum_{n=\pm 1}^{\pm\infty} \frac{e^{j2\pi ny}}{n^4} - \sum_{n=\pm 1}^{\pm\infty} \frac{e^{j2\pi n(y+\frac{1}{2})}}{n^4}\right], \quad (50)$$

where $y = x_p - x_q$, with $p, q \in \{1, 2, \ldots, h\}$ and $p \geq q$.

The constraint $$0 \leq x_1 < x_2 \leq \ldots \leq x_h \leq \frac{1}{2}$$

implies that $$0 \leq x_p - x_q \leq \frac{1}{2} \text{ for } p \geq q,$$

with $p, q \in \{1, 2, \ldots, h\}$. Therefore, $y \in \left[0, \frac{1}{2}\right]$ According to Eq. (37)

$$\sum_{n=\pm 1}^{\pm\infty} \delta_n \frac{e^{j2\pi ny}}{n^4} = -\frac{\pi^4}{3}\left[B_4(y) - B_4\left(y + \frac{1}{2}\right)\right] \quad (51)$$

$$= -\frac{\pi^4}{3}P_3(y), \quad (52)$$

where the polynomial $P_3(y)$ is defined as $$P_3(y) = B_4(y) - B_4\left(\frac{1}{2} + y\right) = -2y^3 + \frac{3y^2}{2} - \frac{1}{16}. \quad (53)$$

Its periodically extended counterpart $\mathcal{P}_3(y)$ is defined as $$\mathcal{P}_3(y) = \mathcal{B}_4(y) - \mathcal{B}_4\left(\frac{1}{2} + y\right). \quad (54)$$

The cost function in Eq. (48) then reduces to $$J_{1h}(x) = -\frac{\pi^2}{3}\Delta u^T \begin{bmatrix} P_3(0) & P_3(x_2-x_1) & \ldots & P_3(x_h-x_1) \\ P_3(x_2-x_1) & P_3(0) & \ldots & P_3(x_h-x_2) \\ \vdots & \vdots & \vdots & \vdots \\ P_3(x_h-x_1) & P_3(x_h-x_2) & \ldots & P_3(0) \end{bmatrix} \Delta u. \quad (55)$$

It is interesting to observe that imposing half-wave symmetry reduces the fourth-order Bernoulli polynomials in Eq. (41) to third-order polynomials. This shows that in the case of half-wave symmetry the cost function is a multivariate cubic polynomial.

2.2.3 Optimization Problem

Writing the optimization problem of half-wave symmetric single-phase optimized pulse patterns in terms of cubic polynomials leads to $$x_{opt} = \arg\underset{x}{\text{minimize}}\ J_{1h}(x) \text{ subject to } \frac{1}{\pi}\sum_{i=1}^{h}\Delta u_i e^{-j\pi xi} = \quad (56)$$

$$\frac{m}{2} \quad 0 \leq x_1 \leq x_2 \leq \ldots \leq x_h \leq \frac{1}{2},$$

with the cost function $J_{1h}$ as in Eq. (55). The vector of normalized switching angles was defined as $x:=[x_1 \ x_2 \ \ldots \ x_h]^T$.

2.3 Quarter- and Half-Wave Symmetry

Quarter-wave symmetry implies that the pulse pattern is symmetric around the midpoints of the two half-cycles. In the following, pulse patterns with imposed quarter- and halfwave symmetry are considered, and $d:=g/4$ is defined as the number of switching angles per quarter cycle.

2.3.1 Fourier Coefficients

In the case of quarter- and half-wave symmetry, the pulse pattern $u(x)$ is an odd function, i.e., $u(x)=-u(-x)$, and the fundamental component is a sine wave. The trigonometric Fourier series expansion of the switching function $u(x)$ is given by $$u(x) = \sum_{n=0}^{\infty} b_n \sin(2\pi n x), \quad (57)$$

where $b_n$ is zero for even values of n. For odd n, $b_n$ is given by $$b_n = 8 \int_0^{0.25} u(x)\sin(2\pi n x) \, dx \quad (58)$$

$$= \frac{4}{n\pi}\left(u_0 + \sum_{i=1}^{d} \Delta u_i \cos(2\pi n x_i)\right). \quad (59)$$

In order to keep the equations symmetric, a dummy variable $x_0$ is introduced and $x_0=0$. The Fourier coefficient $b_n$ for odd n can then be stated as $$b_n = \frac{4}{n\pi}\left(u_0 \cos(2\pi n x_0) + \sum_{i=1}^{d} \Delta u_i \cos(2\pi n x_i)\right). \quad (60)$$

2.3.2 Cost Function

The cost function is now given by $$J_{1q}(x) = \frac{1}{2} \sum_{n=1,3,5,\ldots}^{\infty} \left(\frac{b_n}{n}\right)^2, \quad (61)$$

where the vector of normalized switching angles has been redefined as $x:=[x_1 \ x_2 \ \ldots \ x_d]^T$. The factor ½ accounts for the fact that the Fourier series is single sided. For $k \geq 1$, the k-dimensional vector of weighted. Fourier coefficients is $$b_k = \left[\frac{b_1}{1} \ \frac{b_3}{3} \ \ldots \ \frac{b_k}{k}\right]^T. \quad (62)$$

The binary selector variables $\gamma_n$, with $n \in \{1, 3, 5 \ldots \}$, which assume the value 0 or 1, are introduced. These selector variables will later be used to remove specific harmonics from the cost function. Multiplying the selector variables with the components of the vector of weighted. Fourier coefficients $b_k$ leads to $$\left[\frac{b_1}{1}\gamma_1 \ \frac{b_3}{3}\gamma_3 \ \ldots \ \frac{b_k}{k}\gamma_k\right]^T = D_{qk} b_k \quad (63)$$

with the diagonal matrix $$D_{qk} := \text{diag}(\gamma_1, \gamma_3, \ldots, \gamma_k). \quad (64)$$

According to Eq. (60), $b_k$ can be factored as $$b_k = \frac{4}{\pi} D_{qk} \begin{bmatrix} \frac{\cos(2\pi x_0)}{1^2} & \frac{\cos(2\pi x_1)}{1^2} & \cdots & \frac{\cos(2\pi x_d)}{1^2} \\ \frac{\cos(6\pi x_0)}{3^2} & \frac{\cos(6\pi x_1)}{3^2} & \cdots & \frac{\cos(6\pi x_d)}{3^2} \\ \vdots & \vdots & \ldots & \vdots \\ \frac{\cos(2\pi k x_0)}{k^2} & \frac{\cos(2\pi k x_1)}{k^2} & \cdots & \frac{\cos(2\pi k x_d)}{k^2} \end{bmatrix} \Delta u_q, \quad (65)$$

where $$\Delta u_q = [u_0 \ \Delta u_1 \ \ldots \ \Delta u_d]^T \quad (66)$$

is the augmented vector of switching transitions. For each $k|\{1, 3, 5, \ldots \}$, define $$J_{1qk}(x) = \frac{1}{2} b_k^T D_{qk}^* D_{qk} b_k. \quad (67)$$

Due to the fact that $D^*_{qk} D_{qk} = D_{qk}$, Eq. (67) simplifies to $$J_{1qk}(x) = \frac{1}{2} b_k^T D_{qk} b_k = \frac{8}{\pi^2} \Delta u_q^T A_{1qk} \Delta u_q, \quad (68)$$

with $$A_{1qk} = \begin{bmatrix} \sum_{n=1,3,5,}^{k} \gamma_n \frac{\cos^2(2\pi n x_0)}{n^4} & \sum_{n=1,3,5,}^{k} \gamma_n \frac{\cos(2\pi n x_0)\cos(2\pi n x_1)}{n^4} & \cdots & \sum_{n=1,3,5,}^{k} \gamma_n \frac{\cos(2\pi n x_0)\cos(2\pi n x_d)}{n^4} \\ \sum_{n=1,3,5,}^{k} \gamma_n \frac{\cos(2\pi n x_0)\cos(2\pi n x_1)}{n^4} & \sum_{n=1,3,5,}^{k} \gamma_n \frac{\cos^2(2\pi n x_1)}{n^4} & \cdots & \sum_{n=1,3,5,}^{k} \gamma_n \frac{\cos(2\pi n x_1)\cos(2\pi n x_d)}{n^4} \\ \vdots & \vdots & \ldots & \vdots \\ \sum_{n=1,3,5,}^{k} \gamma_n \frac{\cos(2\pi n x_0)\cos(2\pi n x_d)}{n^4} & \sum_{n=1,3,5,}^{k} \gamma_n \frac{\cos(2\pi n x_1)\cos(2\pi n x_d)}{n^4} & \cdots & \sum_{n=1,3,5,}^{k} \gamma_n \frac{\cos^2(2\pi n x_d)}{n^4} \end{bmatrix}.$$

Since $J_{1q}(x) = \lim_{k \to \infty} J_{1qk}(x)$, (69)

$$J_{1q}(x) = \frac{8}{\pi^2}\Delta u_q^T A_{1q} \Delta u_q,$$

with $$A_{1q} = \begin{bmatrix} \sum_{n=1,3,5,}^{\infty} \gamma_n \frac{\cos^2(2\pi n x_0)}{n^4} & \sum_{n=1,3,5,}^{\infty} \gamma_n \frac{\cos(2\pi n x_0)\cos(2\pi n x_1)}{n^4} & \cdots & \sum_{n=1,3,5,}^{\infty} \gamma_n \frac{\cos(2\pi n x_0)\cos(2\pi n x_d)}{n^4} \\ \sum_{n=1,3,5,}^{\infty} \gamma_n \frac{\cos(2\pi n x_0)\cos(2\pi n x_1)}{n^4} & \sum_{n=1,3,5,}^{\infty} \gamma_n \frac{\cos^2(2\pi n x_1)}{n^4} & \cdots & \sum_{n=1,3,5,}^{\infty} \gamma_n \frac{\cos(2\pi n x_1)\cos(2\pi n x_d)}{n^4} \\ \vdots & \vdots & \cdots & \vdots \\ \sum_{n=1,3,5,}^{\infty} \gamma_n \frac{\cos(2\pi n x_0)\cos(2\pi n x_d)}{n^4} & \sum_{n=1,3,5,}^{\infty} \gamma_n \frac{\cos(2\pi n x_1)\cos(2\pi n x_d)}{n^4} & \cdots & \sum_{n=1,3,5,}^{\infty} \gamma_n \frac{\cos^2(2\pi n x_d)}{n^4} \end{bmatrix}.$$

Each of the sums in Matrix $A_{1q}$ is of the form $$S_{1q} = \sum_{n=1,3,5,\ldots}^{\infty} \gamma_n \frac{\cos(2\pi n x_p)\cos(2\pi n x_q)}{n^4} \quad (70)$$

$$= \frac{1}{2}\sum_{n=1,3,5,\ldots}^{\infty} \gamma_n \frac{\cos(2\pi n(x_p + x_q))}{n^4} + \frac{1}{2}\sum_{n=1,3,5,\ldots}^{\infty} \gamma_n \frac{\cos(2\pi n(x_p - x_q))}{n^4} \quad (71)$$

$$= \frac{1}{2}\sum_{n=1,3,5,\ldots}^{\infty} \gamma_n \frac{\cos(2\pi n(x_q + x_p))}{n^4} + \frac{1}{2}\sum_{n=1,3,5,\ldots}^{\infty} \gamma_n \frac{\cos(2\pi n(x_q - x_p))}{n^4}, \quad (72)$$

with $p, q \in \{0, 1, \ldots, d\}$.

Now the fact is used that $$\cos(x) = \frac{1}{2}\left(e^{jx} + e^{-jx}\right) \quad (73)$$

to show that $$S_{1q} = \frac{1}{4}\sum_{n=\pm 1,\pm 3,\pm 5,\ldots}^{\infty} \gamma_n \frac{e^{j2\pi n(x_p + x_q)}}{n^4} + \frac{1}{4}\sum_{n=\pm 1,\pm 3,\pm 5,\ldots}^{\pm\infty} \gamma_n \frac{e^{j2\pi n(x_p - x_q)}}{n^4}. \quad (74)$$

Up to this point the formulation is general and applies to both single- and three-phase converters with half- and quarter-wave symmetry. According to Eq. (57), $\gamma_n = 1$ for $n = 1, 3, 5, \ldots$ in the case of a single-phase converter with quarter- and half-wave symmetry.

Hence $$S_{1q} = \frac{1}{4}\sum_{n=\pm 1,\pm 3,\pm 5,\ldots}^{\pm\infty} \frac{e^{j2\pi n(x_p + x_q)}}{n^4} + \frac{1}{4}\sum_{n=\pm 1,\pm 3,\pm 5,\ldots}^{\pm\infty} \frac{e^{j2\pi n(x_p - x_q)}}{n^4}. \quad (75)$$

In Eq. (49) binary selector variables $\delta_n$ had been defined, which are zero for even harmonic orders n. With their help, Eq. (75) is rewritten as $$S_{1q} = \frac{1}{4}\sum_{n=\pm 1}^{\pm\infty} \delta_n \frac{e^{j2\pi n(x_p + x_q)}}{n^4} + \frac{1}{4}\sum_{n=\pm 1}^{\pm\infty} \delta_n \frac{e^{j2\pi n(x_p + x_q)}}{n^4} \quad (76)$$

$$= -\frac{\pi^4}{12}[\mathcal{P}_3(x_p + x_q) + \mathcal{P}_3(x_p - x_q)], \quad (77)$$

where Eq. (52) has been used.

For a single-phase converter with quarter- and half-wave symmetry, the constraint $$0 \le x_0 \le x_1 \le \cdots \le x_d \le \frac{1}{4}$$

is imposed on the normalized switching angles. This constraint implies that $$0 \le x_p + x_q \le \frac{1}{2} \text{ and } 0 \le x_p - x_q \le \frac{1}{4}$$

for $p \ge q$, with $p, q \in \{0, 1, \ldots, d\}$.

Hence $\mathcal{P}_3(y)$ in Eq. (77) is equal to $P_3(y)$, and the cost function is $$J_{1q}(x) = \frac{8}{\pi^2}\Delta u_q^T A_{1q} \Delta u_q, \quad (78)$$

with $$A_{1q} = \frac{\pi^4}{12}\begin{bmatrix} P_3(2x_0) + P_3(0) & P_3(x_1 + x_0) + P_3(x_1 - x_0) & \cdots & P_3(x_d + x_0) + P_3(x_d - x_0) \\ P_3(x_1 + x_0) + P_3(x_1 - x_0) & P_3(2x_1) + P_3(0) & \cdots & P_3(x_4 + x_1) + P_3(x_d - x_1) \\ \vdots & \vdots & \vdots & \vdots \\ P_3(x_d + x_0) + P_3(x_d - x_0) & P_3(x_d + x_1) + P_3(x_d - x_1) & \cdots & P_3(2x_d) + P_3(0) \end{bmatrix}.$$

2.3.3 Optimization Problem

For single-phase OPPs with quarter- and half-wave symmetry, the optimization problem in terms of cubic polynomials can now be written as $$x_{opt} = \arg \min_{x} J_{1q}(x) \quad (79)$$

$$\text{subject to } \frac{4}{\pi}\left(u_0 + \sum_{i=1}^{d}\Delta u_i \cos(2\pi x_i)\right) = m$$

$$0 \le x_1 \le x_2 \le \cdots \le x_d \le \frac{1}{4}.$$

The cost function $J_{1q}$ is given in Eq. (78). The vector of normalized switching angles was defined as $x:=[x_1\ x_2\ \ldots\ x_d]^T$.

3 Three-Phase Formulation with Phase Symmetry

In this section optimized pulse patterns for a three-phase converter 10 are considered. The main complication with the three-phase formulation is that the cost function may become a piecewise multivariate polynomial function.

It is assumed that the three-phase load connected to the converter is balanced. For an active RL load, this implies that the amplitudes of the sinusoidal phase voltages are equal, the voltages are phase shifted by 120° with respect to each other, and the ohmic resistances and inductances are the same in the three phases. 120° symmetry may be imposed on the optimized pulse pattern. This implies that the switching functions in phases b and c are the same as in phase a except for being phase shifted by 120° and 240°, respectively.

3.1 Full-Wave Symmetry

Consider the single-phase switching function u(x) with period 1 and g switching angles. Neither quarter- nor half-wave symmetry is imposed. The three-phase optimized pulse pattern is constructed from the single-phase switching function by imposing 120° symmetry between the three phases.

3.1.1 Cost Function

Harmonics of order $n=\pm 3, \pm 6, \pm 9, \ldots$ are called triplen-order harmonics. Owing to the phase symmetries in the optimized pulse pattern and the load, the triplen-order voltage harmonics are common-mode harmonics, which do not induce harmonic currents. These harmonics may, thus, be removed from the cost function, which is defined as $$J_{\mathcal{H}}(x) = \sum_{n=\pm 1, \pm 2, \pm 4, \ldots}^{\pm\infty} \left(\frac{|c_n|}{n}\right)^2, \text{ where } x:=[x_1 x_2\ \ldots\ x_g]^T. \quad (80)$$

The derivations in Sect. 2.1 that led to the matrix A in Eq. (33) are directly applicable also to the three-phase case, provided that harmonics of triplen order are not penalized in the cost function. This is achieved by setting the binary selector variables $\delta_n$ of Eq. (22) equal to $$\delta_n = \begin{cases} 0 & \text{for } n \in \{0, \pm 3, \pm 6, \ldots\} \\ 1 & \text{for } n \in \{\pm 1, \pm 2, \pm 4, \ldots\} \end{cases} \quad (81)$$

by defining $$\delta_n = \frac{1}{3}\left(2 - e^{j\frac{2\pi n}{3}} - e^{-j\frac{2\pi n}{3}}\right). \quad (82)$$

The infinite sums in Eq. (33) are now of the form $$S_{3f}(y) := \quad (83)$$

$$\sum_{n=\pm 1}^{\pm\infty} \delta_n \frac{e^{j 2\pi n y}}{n^4} = \frac{1}{3}\left[2\sum_{n=\pm 1}^{\pm\infty} \frac{e^{j 2\pi n y}}{n^4} - \sum_{n=\pm 1}^{\pm\infty} \frac{e^{j 2\pi n(y+\frac{1}{3})}}{n^4} - \sum_{n=\pm 1}^{\pm\infty} \frac{e^{j 2\pi n(y-\frac{1}{3})}}{n^4}\right],$$

where $y = x_p - x_q$, with $p, q \in \{1, 2, \ldots, g\}$ and $p \ge q$.

The infinite sums can be rewritten with the help of Eq. (37) as $$S_{3f}(y) = -\frac{2\pi^4}{9}\left[2\mathcal{B}_4(y) - \mathcal{B}_4\left(y+\frac{1}{3}\right) - \mathcal{B}_4\left(y-\frac{1}{3}\right)\right] \quad (84)$$

$$= -\frac{2\pi^4}{3}\begin{cases} -\frac{4y^3}{3} + \frac{8y^2}{9} - \frac{8}{243} & \text{if } 0 \le y \le \frac{1}{3} \\ -\frac{4y^2}{9} + \frac{4y}{9} - \frac{20}{243} & \text{if } \frac{1}{3} \le y \le \frac{2}{3} \\ \frac{4y^3}{3} - \frac{28y^2}{9} + \frac{20y}{9} - \frac{116}{243} & \text{if } \frac{2}{3} \le y \le 1 \end{cases} \quad (85)$$

For $0 \le y \le 1$, $S_{3f}(y)$ of Eq. (84) can also be written in terms of absolute value functions, i.e.:

$$S_{3f}(y) = -\frac{2\pi^4}{9}\left[2B_4(y) - B_4\left|y-\frac{2}{3}\right| - B_4\left|y-\frac{1}{3}\right|\right] \quad (86)$$

$$= -\frac{2\pi^4}{9}\left[\frac{10y}{3} - \frac{10y^2}{3} - \frac{62}{81} + 2\left(y-\frac{2}{3}\right)^2\left|y-\frac{2}{3}\right| + 2\left(y-\frac{1}{3}\right)^2\left|y-\frac{1}{3}\right|\right]. \quad (87)$$

The resulting cost function is given by $$J_{3f}(x) = \frac{1}{4\pi^2}\Delta u^T \begin{bmatrix} S_{3f}(0) & S_{3f}(x_2-x_1) & \cdots & S_{3f}(x_g-x_1) \\ S_{3f}(x_2-x_1) & S_{3f}(0) & \cdots & S_{3f}(x_g-x_2) \\ \vdots & \vdots & \vdots & \vdots \\ S_{3f}(x_g-x_1) & S_{3f}(x_g-x_2) & \cdots & S_{3f}(0) \end{bmatrix} \Delta u \quad (88)$$

with $S_{3f}$ as defined in Eq. (85) or (87), and the vector of switching transitions $\Delta u := [\Delta u_1\ \Delta u_2\ \ldots\ \Delta u_g]^T$.

3.1.2 Optimization Problem

The optimization problem of three-phase optimized pulse patterns with full-wave symmetry and balanced three-phase inductive loads may be stated in terms of the single-phase switching function with Bernoulli polynomials:

$$x_{opt} = \arg \min_{x} J_{3f}(x) \quad (89)$$

-continued subject to $\frac{1}{2\pi}\sum_{i=1}^{g}\Delta u_i e^{-j2\pi x_i} = \frac{m}{2}$ $\sum_{i=1}^{g} x_i \Delta u_i = u_0$ $0 \leq x_1 \leq x_2 \leq \ldots \leq x_g \leq 1.$ The infinite-sum cost function is given in Eq. (88); the vector of normalized switching angles was defined as $x:=[x_1 \; x_2 \ldots x_g]^T$.

Recall the function $S_{3f}(y)$, which was defined in Eq. (85). Its first-order derivative with respect to y is given by $$\frac{dS_{3f}(y)}{dy} = -\frac{2\pi^4}{3}\begin{cases} -4y^2 + \frac{16y}{9} & \text{if } 0 \leq y \leq \frac{1}{3} \\ -\frac{8y}{9} + \frac{4}{9} & \text{if } \frac{1}{3} \leq y \leq \frac{2}{3}, \\ 4y^2 - \frac{56y}{9} + \frac{20}{9} & \text{if } \frac{2}{3} \leq y \leq 1 \end{cases} \quad (90)$$

whereas the second-order derivative is given by $$\frac{d^2 S_{3f}(y)}{dy^2} = -\frac{2\pi^4}{3}\begin{cases} -8y + \frac{16}{9} & \text{if } 0 \leq y \leq \frac{1}{3} \\ -\frac{8}{9} & \text{if } \frac{1}{3} \leq y \leq \frac{2}{3}. \\ 8y - \frac{56y}{9} & \text{if } \frac{2}{3} \leq y \leq 1 \end{cases} \quad (91)$$

The function $s_{3f}(y)$, is defined piecewise by cubic polynomials, with $0 \leq y \leq 1$. This so-called cubic spline is continuous and has continuous first and second-order derivatives over the interval (0, 1).

Based on these derivatives the gradient and the Hessian of the cost function $J_{3f}(x)$, in Eq. (88) can be computed. Because the first and second-order derivatives in Eqs. (90) and (91) are continuous over the interval (0, 1), the gradient and the Hessian of the cost function are continuous over the search space. This facilitates the use of standard, e.g. gradient-based, optimization methods.

More specifically, first-order derivatives are required for the commonly-used gradient-based optimization methods, whereas Newton's method also requires second-order derivatives. Newton's method converges quadratically fast to the optimal solution under certain conditions.

3.2 Half-Wave Symmetry

In this section half-wave symmetry within a phase and 120° symmetry between the phases is considered.

3.2.1 Cost Function

Because all harmonics of even order are zero, the cost function simplifies to $$J_{3h}(x) = \sum_{n=\pm 1, \pm 5, \pm 7, \ldots}^{\pm \infty} \left(\frac{|c_n|}{n}\right)^2, \text{ where } x := [x_1 \; x_2 \ldots x_h]^T. \quad (92)$$

The Fourier coefficients $c_n$ are stated in Eq. (46).

As shown in Sect. 2.1.1, the cost function can be rewritten as $$J_{3h}(x) = \frac{1}{\pi^2}\Delta u^T A_{3h} \Delta u \quad (93)$$

with $\Delta u := [\Delta u_1 \; \Delta u_2 \ldots \Delta u_h]^T$. The matrix $A_{3h}$ is equal to A in Eq. (33) with the binary selector variables $$\delta_n = \frac{1}{6}\left(2 - e^{j\frac{2\pi n}{3}} - e^{-j\frac{2\pi n}{3}}\right)(1 - e^{j\pi n}) \quad (94)$$

$$= \frac{1}{6}\left(2 - e^{j\frac{2\pi n}{3}} - e^{-j\frac{2\pi n}{3}} - 2e^{j\pi n} + e^{j\frac{\pi n}{3}} + e^{-j\frac{\pi n}{3}}\right). \quad (95)$$

The selector variables are equal to one for non-triplen odd harmonic orders, i.e. $n = \pm 1, \pm 5, \pm 7, \ldots$; in all other cases, they are set to zero. Consider $y = x_p - x_q$, with p, q ∈ {1, 2, ..., h} and $p \geq q$. The infinite sums in $A_{3h}$ have the form $$S_{3h}(y) := \sum_{n=\pm 1}^{\pm \infty} \delta_n \frac{e^{j2\pi n y}}{n^4} \quad (96)$$

$$= -\frac{\pi^4}{9}\left[2\mathcal{B}_4(y) - \mathcal{B}_4\left(y + \frac{1}{3}\right) - \mathcal{B}_4\left(y - \frac{1}{3}\right) - 2\mathcal{B}_4\left(y + \frac{1}{2}\right) + \mathcal{B}_4\left(y + \frac{1}{6}\right) + \mathcal{B}_4\left(y - \frac{1}{6}\right)\right].$$

Owing to the fact that $$0 \leq y \leq \frac{1}{2},$$

and because the Bernoulli polynomials are symmetric around $$y = \frac{1}{2},$$

we can rewrite this expression as $$S_{3h}(y) = -\frac{\pi^4}{9}\left[\frac{y}{2} + 2\left|y - \frac{1}{3}\right|^3 - 2\left|y - \frac{1}{6}\right|^3 + 3y^2 - 4y^3 - \frac{1}{4}\right], \text{ for } 0 \leq y \leq \frac{1}{2}. \quad (97)$$

This leads to the cost function $$J_{3h}(x) = \frac{1}{\pi^2}\Delta u^T \begin{bmatrix} S_{3h}(0) & S_{3h}(x_2-x_1) & \cdots & S_{3h}(x_h-x_1) \\ S_{3h}(x_2-x_1) & S_{3h}(0) & \cdots & S_{3h}(x_h-x_2) \\ \vdots & \vdots & \vdots & \vdots \\ S_{3h}(x_h-x_1) & S_{3h}(x_h-x_2) & \vdots & S_{3h}(0) \end{bmatrix}\Delta u \quad (98)$$

with $S_{3h}$ defined in Eq. (97),

3.2.2 Optimization Problem

Writing the optimization problem of three-phase optimized pulse patterns with half-wave symmetry in terms of polynomials leads to $$x_{opt} = \arg\min_{x} J_{3h}(x) \quad (99)$$

$$\text{subject to } \frac{1}{\pi}\sum_{i=1}^{h}\Delta u_i e^{-j2\pi x_i} = \frac{m}{2}$$

$$0 \le x_1 \le x_2 \le \ldots \le x_h \le \frac{1}{2},$$

with the cost function $J_{3h}$ as in Eq. (98). The vector of normalized switching angles was defined as $x:=[x_1\ x_2\ \ldots\ x_h]^T$.

3.3 Quarter- and Half-Wave Symmetry

In this section quarter- and half-wave symmetry and 120° symmetry between the phases is considered.

3.3.1 Cost Function

Due to phase symmetry, triplen harmonics are again not penalized in the cost function. The resulting cost function can be derived from Eq. (61) by removing all triplen harmonics, i.e.

$$J_{3q}(x) = \frac{1}{2}\sum_{n=1,5,7,\ldots}^{\infty}\left(\frac{b_n}{n}\right)^2, \text{ where } x := [x_1\ x_2\ \ldots\ x_d]^T. \quad (100)$$

The Fourier coefficient $b_n$ are given by Eq. (59).

Recall the derivation in Sect. 2.3.2 of rewriting the cost function in the quadratic form Eq. (69) with the augmented vector of switching transitions $\Delta u_q$ as defined in Eq. (66). Removing triplen harmonics from the cost function can be achieved by setting the binary selector variables, $\gamma_n$ in Eq. (63), equal to one for non-triplen odd harmonic orders, i.e., $n=\pm 1, \pm 5, \pm 7, \ldots$ and zero for all other values of n. According to Eq. (74) each of the infinite sums in the cost function $J_{3q}$ is given by $$S_{3q} = \frac{1}{4}\sum_{n=\pm 1,\pm 3,\pm 5,\ldots}^{\pm\infty}\gamma_n\frac{e^{j2\pi n(x_p+x_q)}}{n^4} + \frac{1}{4}\sum_{n=\pm 1,\pm 3,\pm 5,\ldots}^{\pm\infty}\gamma_n\frac{e^{j2\pi n(x_p-x_q)}}{n^4}. \quad (101)$$

Eq. (101) can be rewritten with the binary selector variable $\delta_n$ defined in Eq. (95) as $$S_{3q} = \frac{1}{4}\sum_{n=\pm 1}^{\pm\infty}\delta_n\frac{e^{j2\pi n(x_p+x_q)}}{n^4} + \frac{1}{4}\sum_{n=\pm 1}^{\pm\infty}\delta_n\frac{e^{j2\pi n(x_p-x_q)}}{n^4}. \quad (102)$$

With Eq. (96) this expression simplifies to $$S_{3q} = \frac{1}{4}[S_{3h}(x_p+x_q) + S_{3h}(x_p-x_q)]. \quad (103)$$

Recall that the constraint $$0 \le x_0 \le x_1 \le \ldots \le x_d \le \frac{1}{4}$$

implies that $$0 \le x_p+x_q \le \frac{1}{2} \text{ and } 0 \le x_p-x_q \le \frac{1}{4} \text{ for } p \ge q, \text{ with } p,q \in \{0,1,\ldots,d\}.$$

Hence the simplified expression of $S_{3q}$ in Eq. (97) is also applicable here.

This leads to the cost function $$J_{3q}(x) = \frac{2}{\pi^2}\Delta u_q^T A_{3q}\Delta u_q, \quad (104)$$

with $$A_{3q} = \begin{bmatrix} S_{3h}(2x_0)+S_{3h}(0) & S_{3h}(x_1+x_0)+S_{3h}(x_1-x_0) & \cdots & S_{3h}(x_d+x_0)+S_{3h}(x_d-x_0) \\ S_{3h}(x_1+x_0)+S_{3h}(x_1-x_0) & S_{3h}(2x_1)+S_{3h}(0) & \cdots & S_{3h}(x_d+x_1)+S_{3h}(x_d-x_1) \\ \vdots & \vdots & \vdots & \vdots \\ S_{3h}(x_d+x_0)+S_{3h}(x_d-x_0) & S_{3h}(x_d+x_1)+S_{3h}(x_d-x_1) & \cdots & S_{3h}(2x_d)+S_{3h}(0) \end{bmatrix}.$$

3.3.2 Optimization Problem

For three-phase optimized pulse patterns with quarter- and half-wave symmetry as well as 120° symmetry between the phases the optimization problem in terms of polynomials can now be written as $$x_{opt} = \arg\min_{x} J_{3q}(x) \quad (105)$$

$$\text{subject to } \frac{4}{\pi}\left(u_0 + \sum_{i=1}^{d}\Delta u_i \cos(2\pi x_i)\right) = m$$

$$0 \le x_1 \le x_2 \le \ldots \le x_d \le \frac{1}{4}$$

The cost function $J_{3q}$ is given in Eq. (104), The vector of normalized switching angles was defined as $x:=[x_1\ x_2\ \ldots\ x_d]^T$.

4 Benefits

This section highlights the numerical benefits, when solving the proposed optimization problems. By avoiding the truncation of the Fourier series and by instead considering the infinite-sum cost function, numerical artefacts in the cost function are avoided. These artefacts tend to manifest themselves in the form of artificial local minima, which slow down the convergence rate of the solver, lead to suboptimal solutions and require many initial points to increase the likelihood of finding a close-to-optimal solution.

The proposed formulations avoid these numerical issues. In particular, fast convergence to the optimal solution is achieved and optimized pulse patterns with lower cost function values can be found with fewer initial points. The improvements are particularly remarkable at high pulse numbers, which have been hitherto considered numerically intractable.

Figure 4:
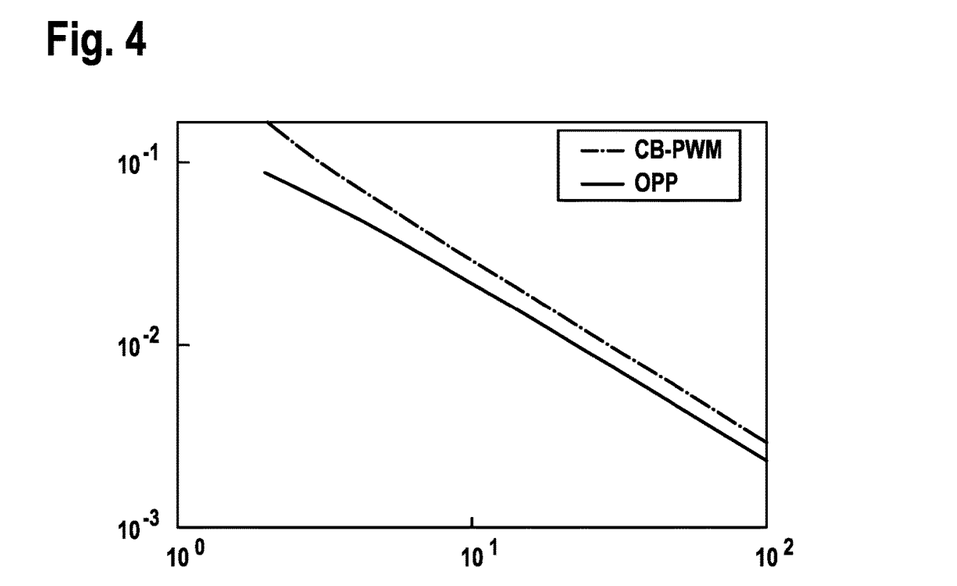
FIG. 4 shows a diagram comparing the total demand distortion produced with a conventional method with the total demand distortion produced with a method according to an embodiment of the present disclosure.

The optimized pulse patterns may be applied to a high-power converter operating at low pulse numbers. The optimized pulse patterns determined with the herein describe method offer advantages at high pulse numbers. A suitable metric is the square root of the cost, $\sqrt{J}$, which is proportional to the current total demand distortion, compare Eq. (12) with Eq. (13). FIG. 4 compares this metric for quarter- and half-wave symmetric optimized pulse patterns (OPP) with that for naturally-sampled carrier-based pulse width modulation (CB-PWM). The comparison is done at the same switching frequency when varying the number of switching angles d between 3 and 100. A double logarithmic graph is used, FIG. 4 shows $\sqrt{J}$ on the vertical axis and the number of switching angles d on the horizontal axis. The figure shows that the ratio of $\sqrt{J}$ for carrier-based pulse width modulation and optimized pulse patterns stays almost constant over the entire range of d, indicating that the relative advantage of optimized pulse patterns in terms of current total demand distortion remains constant.

Figure 5:
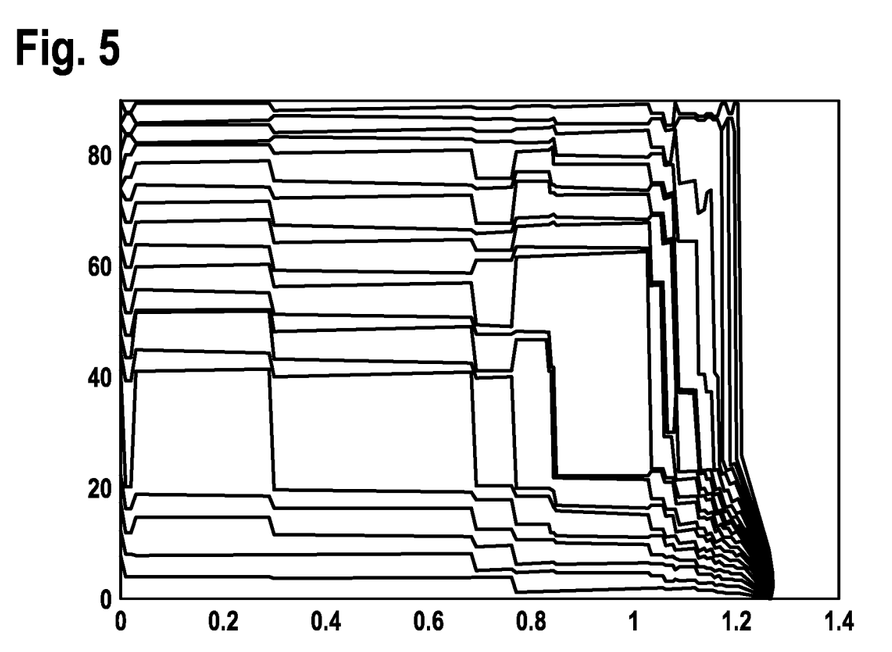
FIG. 5 shows a diagram with switching angles (in degrees) determined with a method according to an embodiment of the present disclosure.

FIG. 5 shows a three-phase optimized pulse patterns with quarter- and half-wave symmetry as well as 120° phase symmetry. The switching angles (in degrees) are depicted on the vertical axis, and the modulation index is depicted on the horizontal axis, Optimized pulse patterns with d=20 switching angles per quarter-wave are depicted, which correspond to the pulse number 41. Assuming a fundamental frequency of 50 Hz, the corresponding switching frequency is approximately 2 kHz. Such a switching frequency is commonly used for high-power low-voltage converters. It clearly can be seen that the dependence of the switching angles with respect to the modulation index is highly nontrivial.

While the present disclosure has been illustrated and described in detail in the drawings and foregoing description, such illustration and description are to be considered illustrative or exemplary and not restrictive; the present disclosure is not limited to the disclosed embodiments. Other variations to the disclosed embodiments can be understood and effected by those skilled in the art, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A method for controlling an electrical converter, the electrical converter converting an input voltage ($v_{in}$) into a multi-level output voltage ($v_{out}$), the method comprising:

determining an optimized pulse pattern (u(x));
determining switching states from the optimized pulse pattern (u(x)); and
applying the switching states to semiconductor switches of the electrical converter, such that the multi-level output voltage ($v_{out}$) is generated,
wherein the optimized pulse pattern (u(x)) comprises a plurality of switching transitions ($\Delta u$), each switching transition ($\Delta u_i$) implementing, at least in part, a transition between two different levels of the multi-level output voltage ($v_{out}$), at a switching angle ($x_i$),
wherein the optimized pulse pattern (u(x)) is determined by optimizing a cost function,
wherein the cost function $J(x)=\Delta u^T A(x) \Delta u$ is a cost matrix A(x), which is multiplied from both sides with a vector $\Delta u$ composed of the plurality of switching transitions ($\Delta u_i$), and
wherein each entry of the cost matrix A(x) depends on fourth order Bernoulli polynomials into which the switching angles ($x_i$) are input.

2. The method according to claim 1,
wherein the cost function is optimized subject to a modulation index constraint, which ensures that the optimized pulse pattern (u(x)) results in a provided modulation index.

3. The method according to claim 1,
wherein the cost function is optimized subject to a DC component constraint, which ensures that a DC component generated by the optimized pulse pattern (u(x)) is 0; and/or wherein the cost function is optimized subject to a transition order constraint, which ensures that an order of the switching transitions is maintained.

4. The method according to claim 1,
wherein entries $A_{ij}(x)$ of the cost matrix A(x) depend on a difference $x_i-x_j$ and/or a sum $x_i+x_j$ of the switching angles $x_i$, and
wherein the entries $A_{ij}(x)$ of the cost matrix A(x) are sums of the fourth order Bernoulli polynomials $B_4$, which are shifted, according to the following equation:

$$A_{ij}(x) \sim \sum_k B_4(y_k(x) + s_k)$$

where $y_k(x)$ is either a difference $x_i-x_j$ or a sum $x_i+x_j$ of the switching angles $x_i$ and where the $s_k$ are constants.

5. The method according to claim 1,
wherein entries $A_{ij}(x)$ of the cost matrix A(x) are $A_{ij}(x) \sim B_4(x_i-x_j)$ where $B_4$ is the fourth order Bernoulli polynomial and $x_i$ are the switching angles.

6. The method according to claim 1,
wherein a half-wave symmetry is imposed on the optimized pulse pattern (u(x)), and
wherein entries $A_{ij}(x)$ of the cost matrix A(x) are $$A_{ij}(x) \sim P_3(x_i - x_j), P_3(y) = B_4(y) - B_4\left(y + \frac{1}{2}\right)$$

where $B_4$ is the fourth order Bernoulli polynomial and $x_i$ are the switching angles.

7. The method of one of the previous claims according to claim 1,
wherein a quarter-wave and half-wave symmetry is imposed on the optimized pulse pattern (u(x)), and wherein entries $A_{ij}(x)$ of the cost matrix $A(x)$ are $$A_{ij}(x) \sim P_3(x_i + x_j) + P_3(x_i - x_j), P_3(y) = B_4(y) - B_4\left(y + \frac{1}{2}\right)$$

where $B_4$ is the fourth order Bernoulli polynomial and $x_i$ are the switching angles.

8. The method according to claim 1,
wherein the multi-level output voltage ($v_{out}$) is a three-phase voltage and a 120° symmetry is imposed between the three phases of the multi-level output voltage ($v_{out}$), and
wherein entries $A_{ij}(x)$ of the cost matrix $A(x)$ are $$A_{ij}(x) \sim S_{3f}(x_i - x_j), S_{3f}(y) = 2B_4(y) - B_4\left(y + \frac{1}{3}\right) - B_4\left(y - \frac{1}{3}\right)$$

where $B_4$ is the fourth order Bernoulli polynomial and $x_i$ are the switching angles.

9. The method according to claim 1,
wherein the multi-level output voltage ($v_{out}$) is a three-phase voltage, a 120° symmetry is imposed between the three phases of the multi-level output voltage ($v_{out}$), and a half-wave symmetry is imposed on the optimized pulse pattern ($u(x)$), and
wherein entries $A_{ij}(x)$ of the cost matrix $A(x)$ are $$A_{ij}(x) \sim S_{3h}(x_i - x_j)$$

$$S_{3h}(y) =$$

$$2B_4(y) - B_4\left(y + \frac{1}{3}\right) - B_4\left(y - \frac{1}{3}\right) - 2B_4\left(y + \frac{1}{2}\right) + B_4\left(y + \frac{1}{6}\right) + B_4\left(y - \frac{1}{6}\right)$$

where $B_4$ is the fourth order Bernoulli polynomial and $x_i$ are the switching angles.

10. The method of one of the previous claims according to claim 1,
wherein the multi-level output voltage ($v_{out}$) is a three phase-voltage, a 120° symmetry is imposed between the three phases of the multi-level output voltage ($v_{out}$), and a half-wave and quarter-wave symmetry is imposed on the optimized pulse pattern ($u(x)$), and
wherein entries $A_{ij}(x)$ of the cost matrix $A(x)$ are $$A_{ij}(x) \sim S_{3h}(x_i + x_j) + S_{3h}(x_i - x_j),$$

$$S_{3h}(y) =$$

$$2B_4(y) - B_4\left(y + \frac{1}{3}\right) - B_4\left(y - \frac{1}{3}\right) - 2B_4\left(y + \frac{1}{2}\right) + B_4\left(y + \frac{1}{6}\right) + B_4\left(y - \frac{1}{6}\right)$$

where $B_4$ is the fourth order Bernoulli polynomial and $x_i$ are the switching angles.

11. The method according to claim 1,
wherein the multi-level output voltage ($v_{out}$) is a two-level voltage.

12. A computer program, which when executed by a processor is adapted for performing the method according to claim 1.

13. A non-transitory computer-readable medium, in which the computer program according to claim 12 is stored.

14. A controller for the electrical converter adapted for performing the method according to claim 1.

15. The electrical converter, comprising:
a plurality of semiconductor switches for converting the input voltage ($v_{in}$) into an output voltage ($v_{out}$); and
a controller according to claim 14.

16. The method according to claim 1, wherein the cost function is optimized subject to a transition order constraint, which ensures that an order of the switching transitions ($\Delta u_i$) is maintained.

17. The method according to claim 1, wherein the cost function is optimized subject to a DC component constraint, which ensures that a DC component generated by the optimized pulse pattern ($u(x)$) is 0.

18. The method according to claim 1,
wherein the cost function is optimized subject to a DC component constraint, which ensures that a DC component generated by the optimized pulse pattern ($u(x)$) is 0; and wherein the cost function is optimized subject to a transition order constraint, which ensures that an order of the switching transitions is maintained.

* * * * *

UNITED STATES PATENT AND TRADEMARK OFFICE
CERTIFICATE OF CORRECTION

| | |
|---|---|
| PATENT NO. | : 12,237,761 B2 |
| APPLICATION NO. | : 17/908159 |
| DATED | : February 25, 2025 |
| INVENTOR(S) | : Tobias Geyer and Hendrik du Toit Mouton |

Page 1 of 1

It is certified that error appears in the above-identified patent and that said Letters Patent is hereby corrected as shown below:

In the Specification

Column 7 Line 48: "converts an it voltage" should be --converts an input voltage--

Column 8 Line 19: "They switching angles" should be --The switching angles--

Column 9 Line 50: "It is assumed that the convener" should be --It is assumed that the converter--

Column 10 Line 24 "the squared current MD" should be --the squared current TDD--

In the Claims

Column 28 Line 64 Claim 7: "of one of the previous claims" should be deleted

Column 29 Line 40 Claim 10: "of one of the previous claims" should be deleted

Signed and Sealed this
Twenty-ninth Day of July, 2025

Coke Morgan Stewart
*Acting Director of the United States Patent and Trademark Office*